United States Patent
Kitano et al.

(10) Patent No.: US 9,182,809 B2
(45) Date of Patent: Nov. 10, 2015

(54) ELECTRONIC DEVICE

(71) Applicant: Panasonic Corporation, Kadoma-shi, Osaka (JP)

(72) Inventors: Katsuya Kitano, Osaka (JP); Toru Wanibuchi, Hyogo (JP); Toshiro Nishimura, Osaka (JP); Hideo Nishimatsu, Osaka (JP); Yuji Takenaka, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 312 days.

(21) Appl. No.: 13/783,819

(22) Filed: Mar. 4, 2013

(65) Prior Publication Data

US 2014/0082394 A1 Mar. 20, 2014

(30) Foreign Application Priority Data

Sep. 14, 2012 (JP) ................................. 2012-202976

(51) Int. Cl.
| | |
|---|---|
| G06F 1/32 | (2006.01) |
| G06F 1/26 | (2006.01) |
| G06F 1/28 | (2006.01) |
| G06F 1/30 | (2006.01) |
| G06F 1/00 | (2006.01) |

(52) U.S. Cl.
CPC .............. *G06F 1/3287* (2013.01); *G06F 1/263* (2013.01); *G06F 1/28* (2013.01); *G06F 1/30* (2013.01); *G06F 1/00* (2013.01)

(58) Field of Classification Search
CPC ..................................................... G06F 1/3287
USPC ........................................................... 713/324
See application file for complete search history.

(56) References Cited

U.S. PATENT DOCUMENTS

| | | | | |
|---|---|---|---|---|
| 4,816,862 | A * | 3/1989 | Taniguchi et al. | 396/278 |
| 5,450,003 | A * | 9/1995 | Cheon | 323/272 |
| 5,542,077 | A * | 7/1996 | Johnson et al. | 713/300 |
| 5,604,708 | A * | 2/1997 | Helms et al. | 365/229 |
| 6,498,460 | B1 * | 12/2002 | Atkinson | 320/135 |
| 2006/0212137 | A1 * | 9/2006 | Sone | 700/22 |
| 2010/0130263 | A1 * | 5/2010 | Zhang et al. | 455/572 |
| 2012/0297215 | A1 * | 11/2012 | Saba | 713/320 |
| 2013/0007496 | A1 * | 1/2013 | Tamura | 713/323 |

FOREIGN PATENT DOCUMENTS

JP 2003-101624 4/2003

* cited by examiner

*Primary Examiner* — Thomas Lee
*Assistant Examiner* — Volvick Derose
(74) *Attorney, Agent, or Firm* — Hamre, Schumann, Mueller & Larson, P.C.

(57) ABSTRACT

An electronic device comprises a main battery used as a drive power source for driving the electronic device, a secondary battery used as a drive power source instead of the main battery when the main battery cannot be used, a battery detection unit that detects an event of removal of the main battery from the electronic device, and a power control unit that changes the drive power source from the main battery to the secondary battery and controls operation of the electronic device to reduce power consumption by the electronic device when removal of the main battery is detected by the battery detection unit.

9 Claims, 7 Drawing Sheets

ELECTRONIC DEVICE

BACKGROUND

1. Technical Field

The present disclosure relates to an electronic device that is powered by a battery, and relates more particularly to an electronic device that can continue operating on a secondary battery even when the main battery is removed for replacement, for example.

2. Related Art

JP 2003-101624A discloses a portable terminal that has a detector for detecting installation and removal of a battery pack (main battery), and a selector that can switch the power source required for operation of the portable terminal between the battery pack and a backup battery (secondary battery) based on output from the detector. This portable terminal is also configured to monitor the remaining power of the backup battery (the remaining battery capacity), and execute a shutdown process when the remaining power goes to or below a specific threshold.

The portable terminal disclosed in JP-A-2003-101624 enables the user to replace the battery pack while continuing to use the terminal for data input, for example, by means of the backup battery, and prevents loss of data while the battery pack is being replaced because data is saved when the remaining power in the backup battery becomes low.

However, the following problems can occur in this portable terminal while the battery pack is being replaced.

The backup battery is a battery that is provided to supply power for a short time while the battery pack is replaced, and is therefore usually a relatively small, low capacity battery in order to reduce cost, save space, and reduce weight. As a result, the backup battery will be depleted and operation of the portable terminal will be interrupted if replacing the battery pack is not completed within a specific time (such as several minutes) after the backup battery starts supplying power.

As described above, the portable terminal disclosed in JP-A-2003-101624 performs a data backup process when the remaining power of the backup battery becomes low so that data is not lost. While data loss can be prevented by this process that is predicated on the battery running out, interruption of work and use of the portable terminal due to the battery becoming depleted cannot be avoided. In order to comfortably continue using the portable terminal even while replacing the battery, some means of preventing the backup battery from running down is desirable.

If the battery capacity of the backup battery is small, the user must replace the battery pack quickly, and changing the battery pack may be rushed. Depending on the circumstances, such as during a meeting or in a dark environment, quickly replacing the battery pack may be difficult. Conversely, a high capacity backup battery can be used to increase the duration time of the backup battery so that the battery pack can be replaced without haste, but increasing the capacity of the backup battery leads to greater cost and increases the size and weight of the portable terminal.

SUMMARY

The present disclosure is directed to solving the foregoing problem. One non-limiting and exemplary embodiment can increase the time that is used to replace the battery pack without increasing the capacity of the backup battery.

One aspect of the disclosure is an electronic device that has: a first battery used as a drive power source for driving the electronic device; a second battery used as a drive power source instead of the first battery when the first battery cannot be used; a battery removal detection unit that detects an event of removal of the first battery from the electronic device; and a power control unit that changes the drive power source from the first battery to the second battery, and controls operation of the electronic device to reduce power consumption by the electronic device, when removal of the first battery is detected by the battery removal detection unit.

Effect of the Invention

When removal of the first battery from the electronic device is detected, this aspect of the disclosure changes the drive power source from the first battery to the second battery, and controls operation of the electronic device to reduce power consumption by the electronic device. Because power consumption from the second battery is thus suppressed when the first battery is removed, the second battery can drive the electronic device for a longer time, and more time is made available for replacing the first battery.

Other objects and attainments together with a fuller understanding of the disclosure will become apparent and appreciated by referring to the following description and claims taken in conjunction with the accompanying drawings.

DETAILED DESCRIPTION OF PREFERRED EMBODIMENT

A preferred embodiment of a personal computer (an example of an electronic device) according to the present disclosure is described below with reference to the accompanying figures.

1. CONFIGURATION OF A PERSONAL COMPUTER

Figure 1:
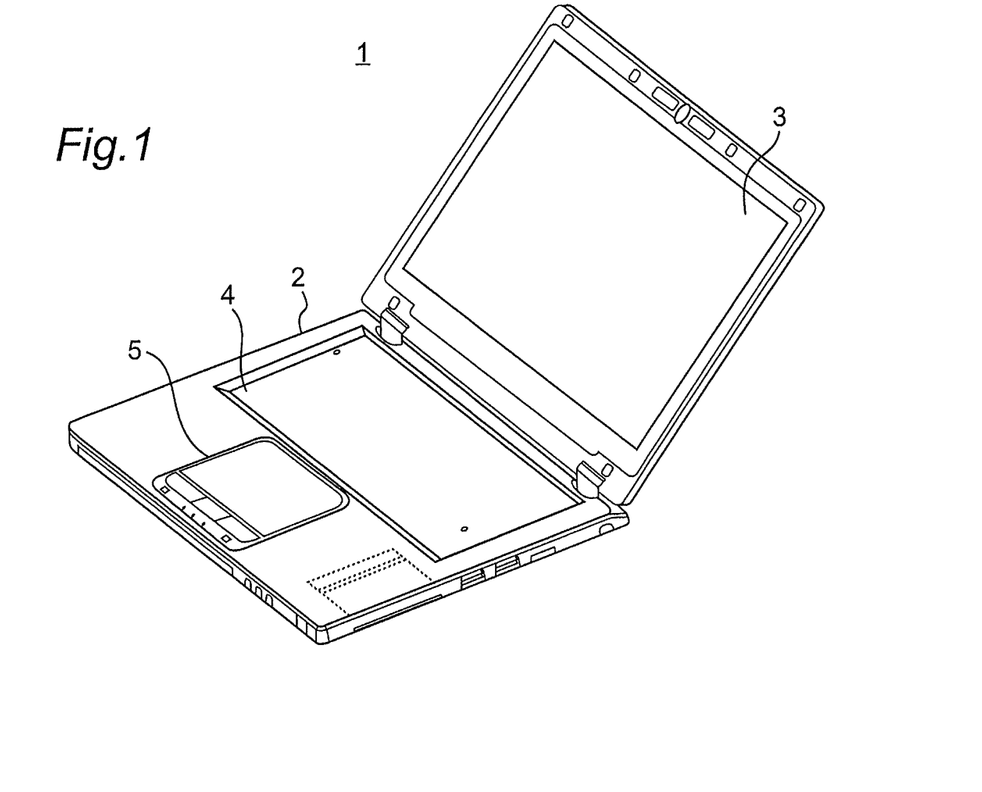
FIG. 1 shows the appearance of a personal computer.

The configuration of a personal computer according to this embodiment of the disclosure is described next with reference to FIG. 1. FIG. 1 shows the appearance of a laptop-type personal computer 1 when open. As shown in the figure, the personal computer 1 has a main body 2, a display 3, a keyboard 4, and a pointing device 5.

The personal computer 1 operates according to an operating system that controls basic operation, and application programs that control a variety of specific processes. The functions of the operating system and application programs are rendered by the programs installed in the personal computer 1.

The main body 2 includes a storage unit that stores the operating system, application programs, and data, and an input/output unit having input/output buffers. The user operates the personal computer 1 by inputting commands from the keyboard 4 and pointing device 5 based on information displayed on the display 3.

Figure 2:
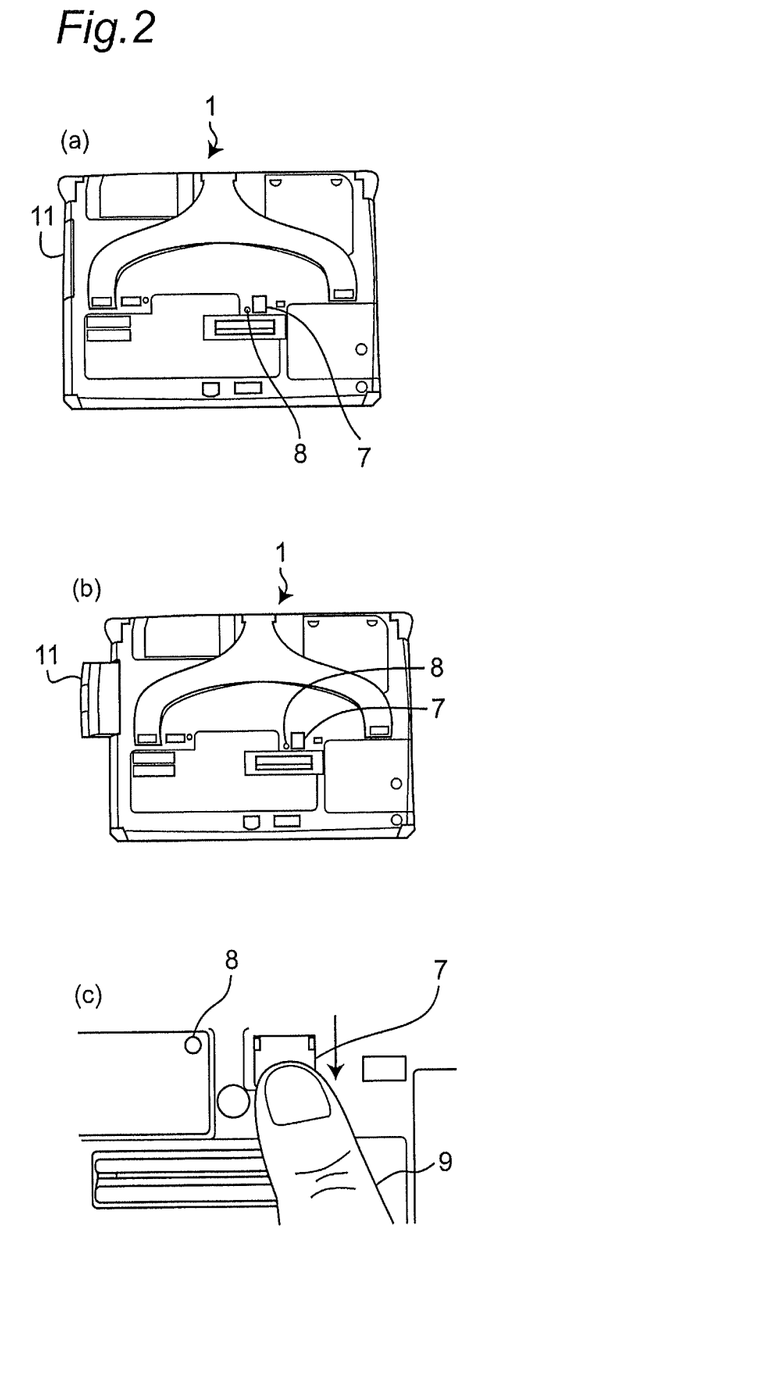
FIG. 2 is used to describe the back of the personal computer.

FIG. 2 shows the back of the personal computer 1. As shown in FIG. 2(a), the personal computer 1 has a removable main battery 11. The personal computer 1 also has a battery lock knob 7 that locks and unlocks the main battery 11 for removal, and an LED 8 that changes color to indicate if the main battery 11 can be removed (for example, lights green if the battery can be removed, and lights red if the battery cannot be removed).

FIG. 2(b) shows when the battery lock knob 7 is released and the main battery 11 can be removed. As shown in the figure, the main battery 11 can be slid and removed from the main body 2.

FIG. 2(c) shows operating the battery lock knob 7 with the user's finger 9. The user can lock and unlock removing the main battery 11 by sliding the battery lock knob 7 appropriately. As described below, the personal computer 1 can detect installation and removal of the main battery 11 from the state of the battery lock knob 7.

Figure 3:
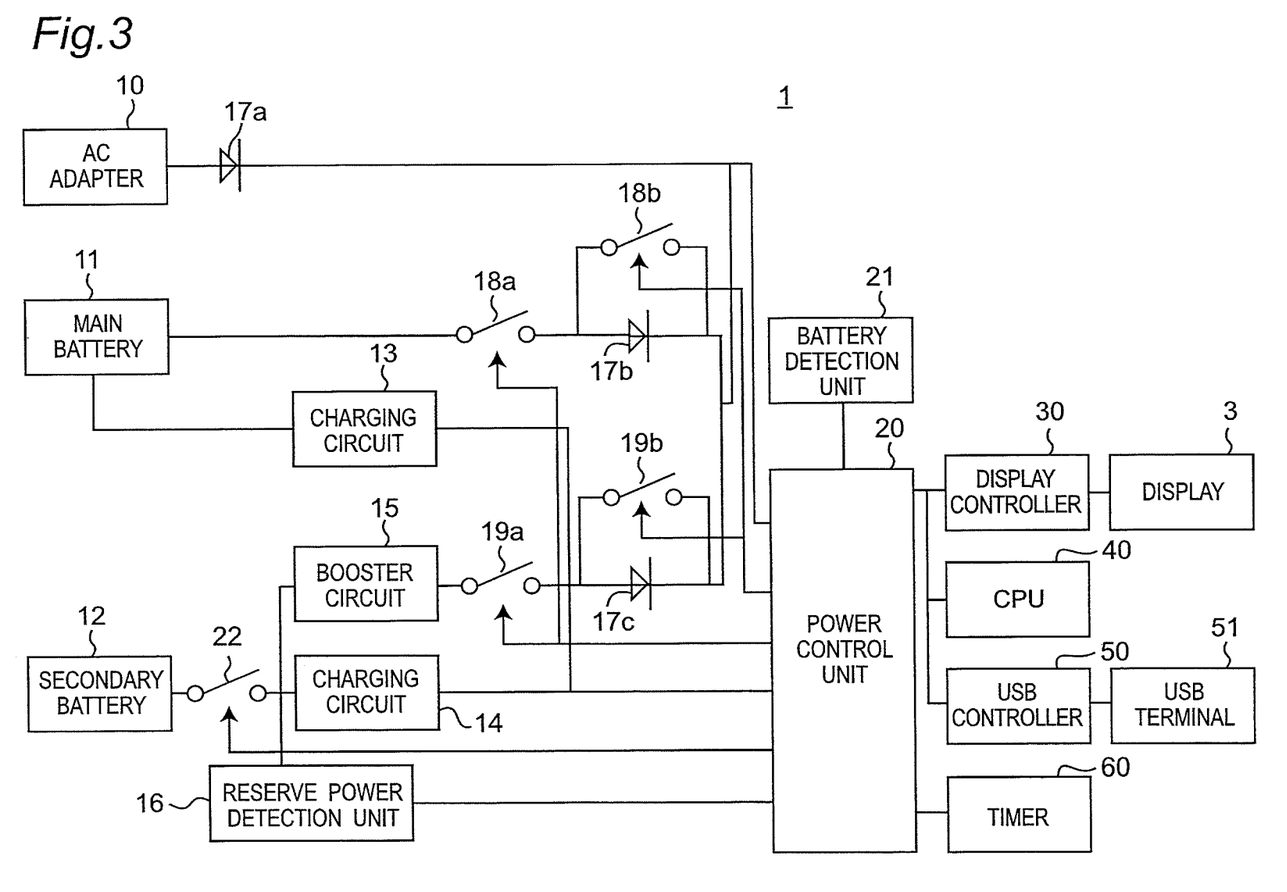
FIG. 3 is a block diagram of the internal configuration of the personal computer.

FIG. 3 is a block diagram showing the internal configuration of the personal computer 1. As shown in the figure, the personal computer 1 has an AC adapter 10, a main battery 11 (first battery), and a secondary battery 12 (second battery) as power sources for personal computer 1 operation. The AC adapter 10 is an adapter that can plug into a commercial power source (outlet) in the home, for example, and converts AC voltage from the commercial supply to a specific DC voltage. The main battery 11 and secondary battery 12 are rechargeable storage batteries, and could be lithium ion batteries, lithium polymer batteries, or other type of rechargeable battery.

When the AC adapter 10 of the personal computer 1 is connected to a commercial power source, the AC adapter 10 is used as the drive power source of the personal computer 1. When the AC adapter 10 of the personal computer 1 is not connected to a commercial power source, the main battery 11 is normally used as the drive power source. The secondary battery 12 is a battery that is used as the drive power source instead of the main battery 11 when the main battery 11 cannot be used, such as when the main battery 11 is being replaced. By having this secondary battery 12, the personal computer 1 features a hot-swappable design enabling the main battery 11 to be replaced while the personal computer 1 is on and being used.

While the main battery 11 can be removed from the personal computer 1 and replaced in this embodiment of the disclosure, the secondary battery 12 is fixed inside the personal computer 1 and cannot be replaced. A configuration in which the secondary battery 12 is replaceable is obviously also conceivable. The secondary battery 12 has a lower charge capacity than the main battery 11, enabling using a small rechargeable battery to save space inside the personal computer 1.

A charging circuit 13 is connected to the main battery 11, and this charging circuit 13 is a circuit that charges the main battery 11 using power supplied from the AC adapter 10. Another charging circuit 14 is likewise connected to the secondary battery 12, and this charging circuit 14 is a circuit that charges the secondary battery 12 using power supplied from the AC adapter 10 or the main battery 11.

A booster circuit 15 is connected to the output of the secondary battery 12, and a function of the booster circuit 15 boosts the output voltage of the secondary battery 12 to substantially the same level as the output voltage of the main battery 11. A remaining power detection unit 16 is also connected to the secondary battery 12, and the remaining power (remaining battery capacity) of the secondary battery 12 can be detected by a function of the remaining power detection unit 16.

The personal computer 1 also has a power control unit 20. The power control unit 20 is configured with an EC controller that provides power control for the entire personal computer 1. The power control unit 20 changes the drive power source of the personal computer 1 between the AC adapter 10, main battery 11, and secondary battery 12, and is connected to the charging circuits 13, 14 and the remaining power detection unit 16. For example, based on output from the remaining power detection unit 16, the power control unit 20 controls the charging circuit 14 to not charge the secondary battery 12 when the remaining power of the secondary battery 12 equals or exceeds a specific threshold. The power control unit 20 also controls electrically disconnecting the secondary battery 12 from the charging circuit 14 by turning a switch 22 off when the main battery 11 is supplying power.

The power control unit 20 is connected to a battery detection unit 21. The battery detection unit 21 is a decision circuit that detects the operation of removing the main battery 11 from the personal computer 1, and the operation of installing the main battery 11 to the personal computer 1.

The battery detection unit 21 determines removal and installation of the main battery 11 based on various conditions. For example, to detect attempted removal of the main battery 11, the battery detection unit 21 uses a configuration that detects the locked or unlocked state of the battery lock knob 7 (for example, determines that the main battery 11 is being removed if the battery lock knob 7 is unlocked), and a configuration that detects opening a battery cover that covers and holds the main battery 11 inside the personal computer 1 based on the output from an internal magnetic switch (for example, determines that the main battery 11 is being removed if the battery cover is open). To detect that the main battery 11 is connected, the battery detection unit 21 uses a configuration that senses the voltage at a specific location in the circuits that are powered by the main battery 11.

The power control unit 20 is also connected to and controls the power supply to a display controller 30 and therethrough to the display 3, the CPU (central processing unit) 40, and the USB (Universal Serial Bus) controller 50 and therethrough to the USB terminal 51. The power control unit 20 is also connected to a timer 60 that keeps time.

The display 3 is any suitable information display means (display unit), such as an LCD or plasma display panel. The display controller 30 is a circuit that controls displaying content on the display 3 as controlled by the power control unit 20.

The CPU 40 is a microprocessor that controls operation of the entire personal computer 1.

The USB terminal 51 is a terminal for connecting a printer, mouse, external storage disc, or other external device, and driving the USB terminal 51 is controlled by the USB controller 50.

When the main battery 11 is removed, the timer 60 counts the time past since the drive power source of the personal computer 1 changes from the main battery 11 to the secondary battery 12.

Diodes 17a, 17b, 17c are reverse current prevention diodes connected to the outputs of the AC adapter 10, main battery 11, and secondary battery 12. The power control unit 20 is configured to switch the power source that supplies power to the personal computer 1 between the main battery 11 and secondary battery 12 by controlling the on/off states of switches 18a, 18b, 19a, 19b. More specifically, by synchronously controlling switch 18a (19a) and the switch 18b (19b) parallel connected to a diode, the power control unit 20 can switch the source of power supplied to the personal computer 1 to the main battery 11 or the secondary battery 12.

The power control unit 20 can also run a shutdown process that safely saves data being processed to an internal hard disk or nonvolatile memory, for example, and then terminates processing by the personal computer 1 using operating system commands.

2. SECONDARY BATTERY CHARGING PROCESS

Figure 4:
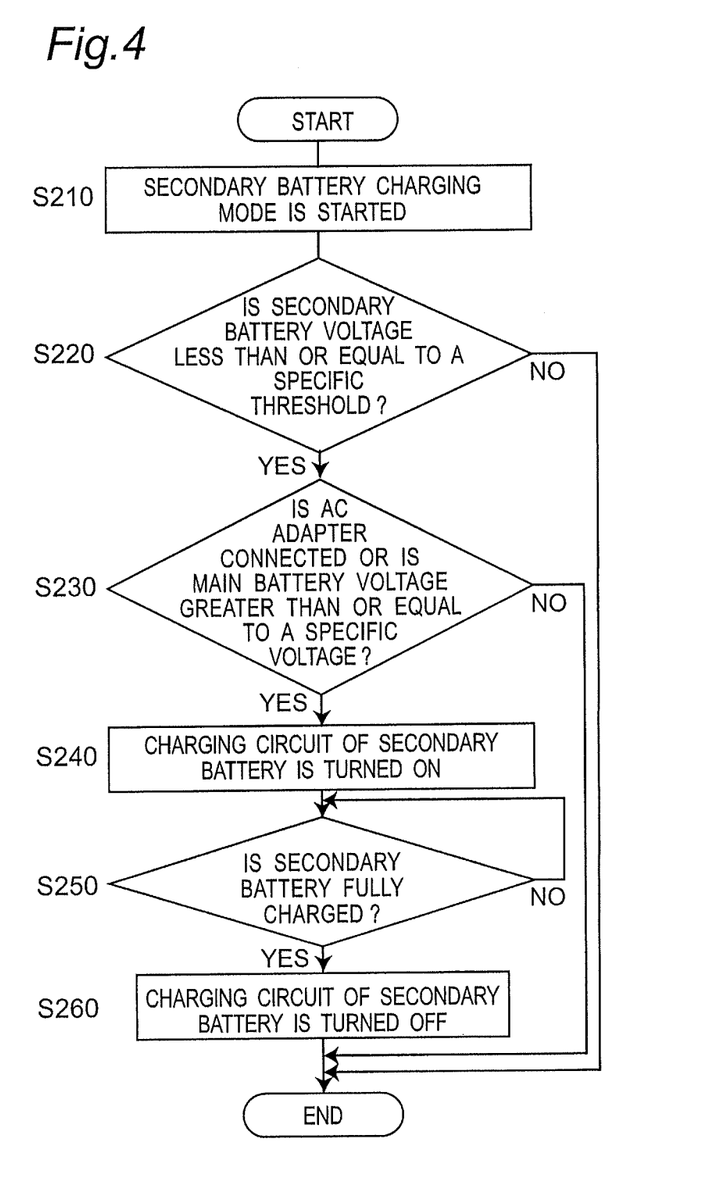
FIG. 4 is a flow chart of operation in the secondary battery charging mode.

The secondary battery 12 charging process executed by the power control unit 20 is described next with reference to the flow chart in FIG. 4. The secondary battery 12 charging process is a charging process that is required in preparation for using the secondary battery 12 as a backup battery when removing the main battery 11.

The power control unit 20 regularly starts the secondary battery 12 charging mode (S210). The power control unit 20 then determines if the secondary battery 12 voltage is less than or equal to a specific threshold (S220). If the secondary battery 12 voltage is determined to be less than or equal to the specific threshold, control goes to the next charging process step (S230). If the secondary battery 12 voltage is determined to be greater than the specific threshold, charging is not necessary and the process ends.

To check if a power source for charging the secondary battery 12 is available in the charging process step S230, the power control unit 20 determines if the AC adapter 10 is connected to a commercial power source or if the main battery 11 voltage is greater than or equal to a specific voltage. If the AC adapter 10 is connected to a commercial power source or the main battery 11 voltage is greater than or equal to a specific voltage, control goes to the next charging process step (S240). If the AC adapter 10 is not connected to a commercial power source and the main battery 11 voltage is less than the specific voltage, a source of power for charging the secondary battery 12 is not available and the process ends.

In step S240, the power control unit 20 turns the charging circuit 14 connected to the secondary battery 12 on. As a result, charging the secondary battery 12 starts. More specifically, when the AC adapter 10 is connected to the commercial power source, the secondary battery 12 is charged from the commercial supply through the AC adapter 10. In this situation, the main battery 11 is also charged from the commercial supply through the AC adapter 10. If the AC adapter 10 is not connected to the commercial power source but the main battery 11 voltage is greater than or equal to the specific threshold, the secondary battery 12 is charged from the main battery 11.

The power control unit 20 then determines if the secondary battery 12 is fully charged (S250). If the power control unit 20 determines the secondary battery 12 is not fully charged, the charging process continues. If the secondary battery 12 is fully charged, the power control unit 20 turns the charging circuit 14 of the secondary battery 12 off (S260), and ends the secondary battery 12 charging process.

3. CONTROL WHEN REPLACING THE BATTERY

Figure 5:
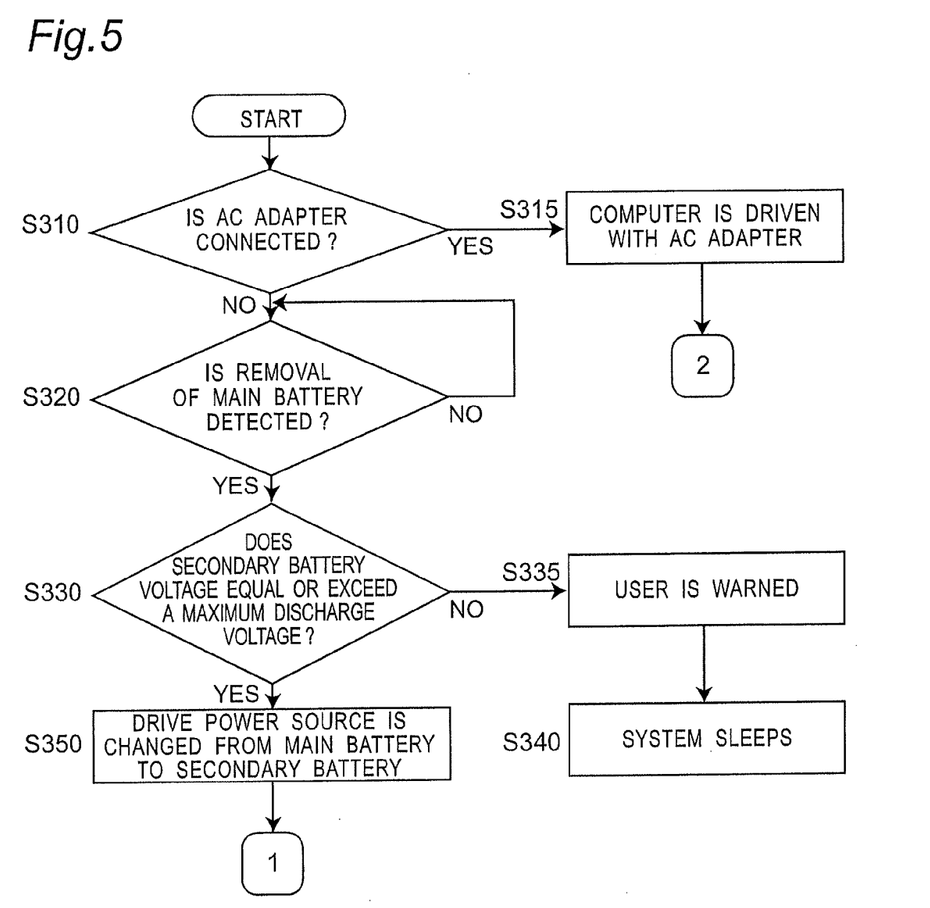
FIG. 5 is a flow chart of operation when replacing the main battery.

The control process executed by the power control unit 20 when replacing the main battery 11 of the personal computer 1 is described next with reference to the flow charts in FIG. 5 to FIG. 7.

In this embodiment the user has plural main batteries 11, and when the remaining power of the main battery 11 installed in the personal computer 1 drops, removes the main battery 11 from the personal computer 1 and replaces it with another main battery 11 that was already charged using a commercial power source etc.

The power control unit 20 determines if the AC adapter 10 of the personal computer 1 is connected to the commercial power source (S310). If the AC adapter 10 is connected to the commercial power source, backup by the secondary battery 12 is not needed and the power control unit 20 drives the personal computer 1 with the AC adapter 10 (S315) and goes to step S510 in FIG. 7. If step S310 determines that the AC adapter 10 of the personal computer 1 is not connected to the commercial power source, control goes to step S320.

In step S320 the power control unit 20 determines if removal of the main battery 11 was detected based on the output of the battery detection unit 21. As described above, the battery detection unit 21 determines if the main battery 11 was removed from the personal computer 1 by detecting the open/closed state of the battery lock knob 7, or detecting opening of the battery cover based on output of a magnetic switch, for example. If the power control unit 20 determines the main battery 11 was removed, control goes to step S330. If removal of the main battery 11 was not detected, step S320 repeats. While the power control unit 20 waits and repeats step S320, other program operations can be performed.

In step S330, the power control unit 20 determines if the secondary battery 12 voltage equals or exceeds a maximum discharge voltage. If the secondary battery 12 voltage is less than the maximum discharge voltage, the power control unit 20 warns the user because the secondary battery 12 cannot be used to drive the personal computer 1 (S335). The power control unit 20 also executes an operating system shutdown process to protect user data from loss due to battery depletion, and puts the system to sleep (S340).

Note that the user can be warned in step S335 by, for example, presenting suitable content on the display 3. The LED 8 that indicates the position of the battery lock knob 7 can be used with great effect to warn the user because the probability that the user attempting to remove the main battery 11 using the battery lock knob 7 will see the LED 8 is high. A specific example of warning is to warn the user by causing the LED 8 to blink red. The method of assuring the reliability of the secondary battery 12 is not limited to detecting the battery voltage, and other methods may also be used. For example, the power control unit 20 could be configured to determine deterioration of the secondary battery 12. For example, when the power control unit 20 determines that the secondary battery 12 has deteriorated, a warning with the LED 8 is done. Battery deterioration can be determined by measuring the rate of decrease in the output voltage during discharge, and determining the battery has deteriorated if the voltage drop is faster than a specific threshold. Note that issuing a warning with the LED 8 can be done in a step other than step S320. For example, a warning could be presented constantly if the reliability of the secondary battery 12 is low.

Figure 6:
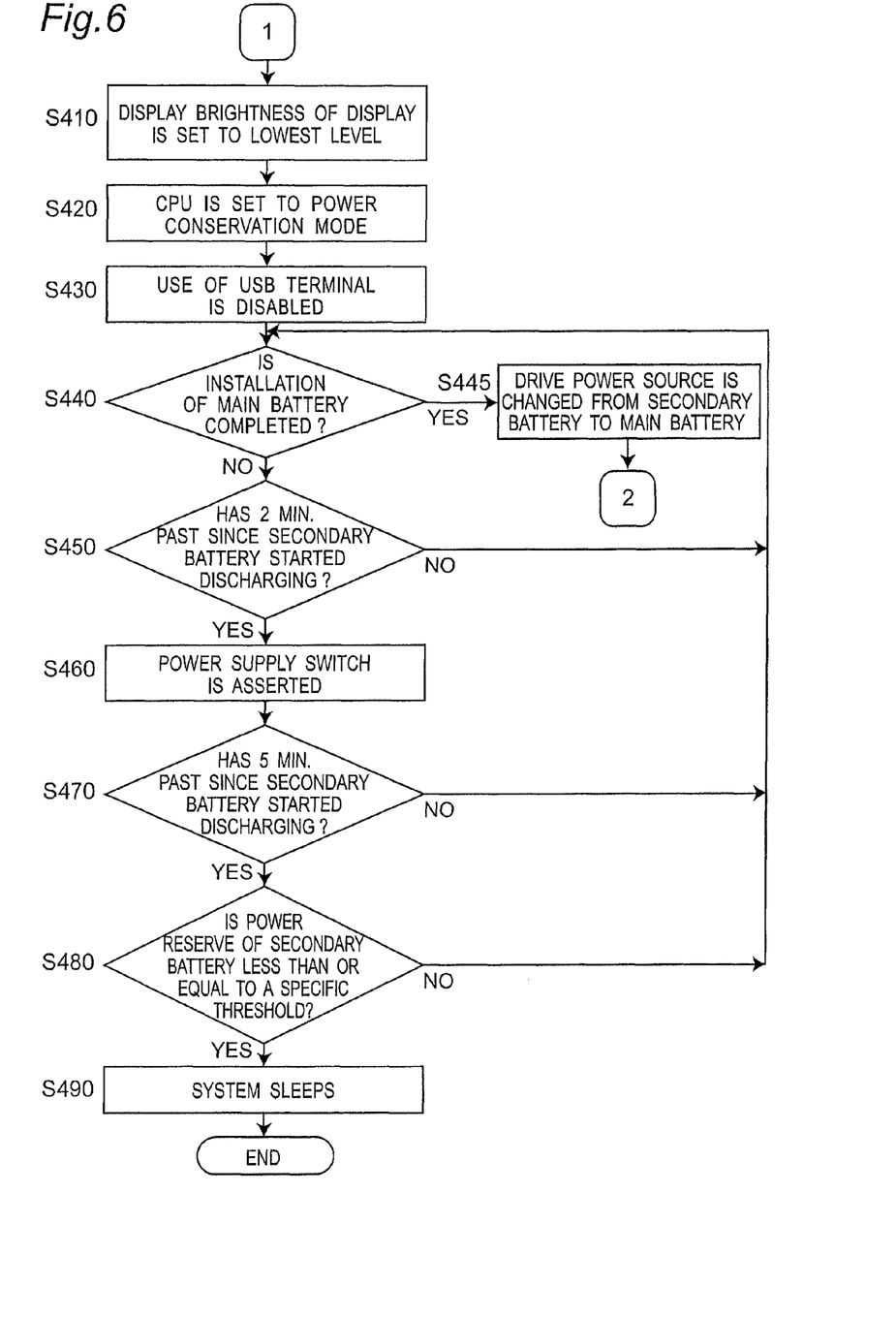
FIG. 6 is a flow chart of operation when replacing the main battery.
Figure 7:
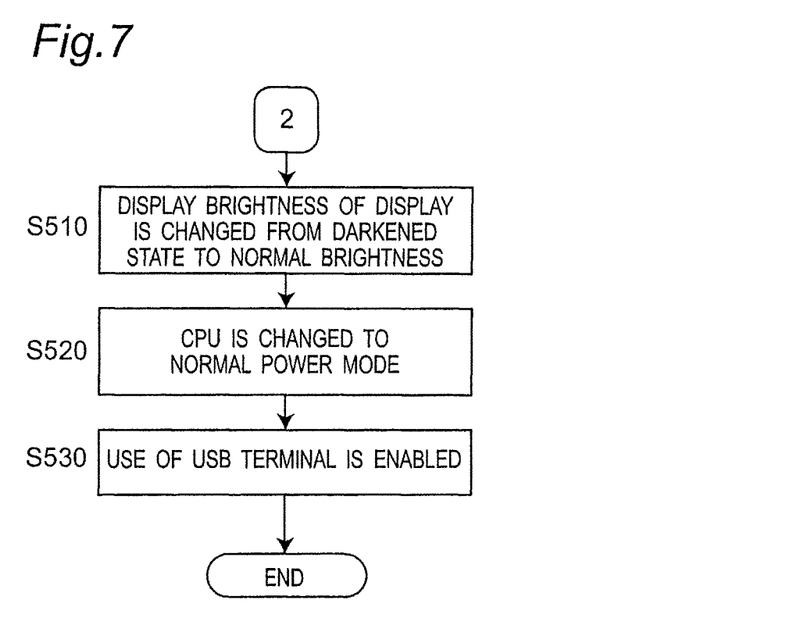
FIG. 7 is a flow chart of operation when replacing the main battery.

If in step S320 the voltage of the secondary battery 12 is greater than or equal to the maximum discharge voltage, the power control unit 20 changes the drive power source of the personal computer 1 from the main battery 11 to the secondary battery 12 by controlling switches 18a, 18b, 19a, 19b (S350), and goes to step S410 in FIG. 6. At this time the timer 60 starts counting the time past from when the drive source changes from the main battery 11 to the secondary battery 12. The LED 8 is also driven green to notify the user that the main battery 11 can be removed.

To reduce power consumption by the personal computer 1, the power control unit 20 sets the display brightness of the display 3 to the lowest level through the display controller 30 (S410). Note that while this embodiment sets the display brightness of the display 3 to the lowest level in order to minimize power consumption, the display brightness does not need to be set to the lowest level, and power consumption can be reduced by lowering the display brightness of the display 3 from the current level.

The power control unit 20 also sets the CPU 40 to a power conservation mode in order to reduce the power consumption of the personal computer 1 (S420). The power control unit 20 could switch to this power conservation mode by lowering the drive frequency of the CPU 40, lowering the drive voltage of the CPU 40, or using another desirable power conservation method.

To reduce power consumption by the personal computer 1, the power control unit 20 also disconnects external devices by disabling use of the USB terminal by means of the USB controller 50 (S430). Note, further, that while disabling use of the USB terminal is described here, power consumption can also be reduced by disabling use of IEEE-1394 connectors and other external connectors.

The power control unit 20 in this embodiment of the disclosure executes each of steps S410 to S430 to reduce the power consumption of the personal computer 1, but the power control unit 20 could execute only one or two of steps S410 to S430. Further alternatively, the power control unit 20 could use steps other than those described in steps S410 to S430 to reduce power consumption by the personal computer 1.

Based on output of the battery detection unit 21, the power control unit 20 then determines if installation of the main battery 11 is completed (S440). If installation of the main battery 11 is determined not complete, control goes to step S450. If installation of the main battery 11 is complete, replacing the main battery 11 is completed and the role of the secondary battery 12 has ended. The power control unit 20 therefore changes the drive power source of the personal computer 1 from the secondary battery 12 to the main battery 11 using switches 18a, 18b, 19a, 19b (S445), and control goes to step S510.

In step S450, the power control unit 20 measures the time past since the drive source was switched from the main battery 11 to the secondary battery 12 in step S350 based on the output of the timer 60, and determines if a first specific time (such as 2 minutes) has past since the secondary battery 12 started discharging. If this step determines that the first specific time (2 minutes) has not past since the secondary battery 12 started discharging, the power control unit 20 returns to step S440. If the first specific time (2 minutes) has past since the secondary battery 12 started discharging, the power control unit 20 asserts a power supply switch (S460). Power consumption by the personal computer 1 drops as a result of this assertion.

Next, the power control unit 20 measures the time past from when the drive source switched from the main battery 11 to the secondary battery 12 in S350 based on output from the timer 60, and determines if a second specific time (such as 5 minutes) has past since the secondary battery 12 started discharging (S470). If this step determines that the second specific time (5 minutes) has not past since the secondary battery 12 started discharging, the power control unit 20 returns to step S440. If the second specific time (5 minutes) has past since the secondary battery 12 started discharging, the power control unit 20 goes to the next step (S480).

The power control unit 20 then determines based on the output of the remaining power detection unit 16 if the power reserve of the secondary battery 12 is less than or equal to a specific threshold (S480). As a result, if the power reserve of the secondary battery 12 is greater than the threshold, the backup operation can continue using the secondary battery 12 and the power control unit 20 therefore returns to S440. However, if the power reserve of the secondary battery 12 is less than or equal to the threshold, the backup operation cannot continue using the secondary battery 12, and the power control unit 20 executes the operating system shutdown process to protect user data from loss, and puts the system to sleep (S490).

As described above, the power control unit 20 executes a shutdown process that turns device power off (S490) when the secondary battery 12 is used as the drive power source, the elapsed time measured by the timer 60 exceeds a specific time (S470), and the power reserve of the secondary battery 12 is less than or equal to a specific threshold (S480). However, the power control unit 20 could execute the shutdown process that turns device power off regardless of the power reserve in the secondary battery 12 if the elapsed time measured by the timer 60 exceeds a specific time. Further alternatively, the power control unit 20 could execute the shutdown process that turns device power off regardless of the elapsed time measured by the timer 60 if the power reserve of the secondary battery 12 drops to less than or equal to a specific threshold.

In other words, the power control unit 20 could execute the shutdown process that turns device power off when the secondary battery 12 is used as the drive power source if the main battery 11 has not been installed in the personal computer 1 by the time the elapsed time measured by the timer 60 exceeds a specific time.

Control by the power control unit 20 after step S510 is described next with reference to the flow chart in FIG. 7. This control process executes when step S310 in FIG. 5 above determines the AC adapter of the personal computer 1 is connected to the commercial supply, or installation (replacement) of the main battery 11 is determined completed in S440 in FIG. 6, because the personal computer 1 does not need backup by the secondary battery 12.

Because the personal computer 1 is already driven by the AC adapter 10 or a new main battery 11, sufficient power can be supplied, and there is no need to sacrifice performance in order to reduce power consumption. The power control unit 20 therefore controls the display controller 30 to change the display brightness of the display 3 from the darkened state to normal brightness (S510). The power control unit 20 also boosts the drive frequency or drive voltage of the CPU 40, and changes from the power conservation mode to the normal power mode (S520). The power control unit 20 also controls the USB controller 50 to enable using the USB terminal 51, and enables connecting external devices (S530).

The power control unit 20 thus completes the control process used when the user replaces the main battery 11 of the personal computer 1.

4. CONCLUSION

This embodiment of the disclosure discloses a personal computer 1 that has a main battery 11 used as power source for driving the personal computer 1, a secondary battery 12 that is used as a power source in place of the main battery 11 when the main battery 11 cannot be used, a battery detection unit 21 that detects an event of removal of the main battery 11, and a power control unit 20 that changes the power source from the main battery 11 to the secondary battery 12, and controls operation of the personal computer 1 to reduce power consumption based on the output of the battery detection unit 21.

Thus configured, when removing the main battery 11 from the main device is detected, the power source changes from the main battery 11 to the secondary battery 12 based on removal of the main battery 11, and operation of the personal computer 1 is controlled so that power consumption by the personal computer 1 is reduced. As a result, power consumption from the secondary battery 12 is suppressed when the main battery 11 has been removed, the duration time of the secondary battery 12 is thus extended, and more time is available for replacing the main battery 11.

The foregoing embodiment describes a personal computer 1 as an example of an electronic device according to the disclosure. The disclosure is not so limited, however, and can be broadly applied to battery-powered electronic devices including cell phones, video cameras, portable televisions, and portable BluRay disc players.

INDUSTRIAL APPLICATION

The electronic device disclosed herein can be used in devices including personal computers, digital cameras, movie cameras, portable televisions, cell phones, and portable BluRay disc players.

The disclosure being thus described, it will be obvious that it may be varied in many ways. Such variations are not to be regarded as a departure from the spirit and scope of the invention, and all such modifications as would be obvious to one skilled in the art are intended to be included within the scope of the following claims.

What is claimed is:

1. An electronic device comprising:
   a first battery used as a drive power source for driving the electronic device;
   a second battery used as the drive power source instead of the first battery when the first battery cannot be used;
   a battery removal detection unit that detects an event of removal of the first battery from the electronic device;
   a power control unit that changes the drive power source from the first battery to the second battery, and controls operation of the electronic device to reduce power consumption by the electronic device, when removal of the first battery is detected by the battery removal detection unit; and
   a timer that counts an elapsed time from when the drive power source changes from the first battery to the second battery,
   wherein the power control unit executes a shutdown process that turns electronic device power off when the second battery is used as the drive power source and the first battery has not been installed in the electronic device even though the elapsed time counted by the timer exceeds a specific time;
   wherein the power control unit asserts a power supply switch after passing of a first time threshold and executes a shutdown process that turns electronic device power off after passing of a second time threshold, the second time threshold being longer than the first time threshold, when the second battery is used as the drive power source and the first battery has not been installed in the electronic device even though the elapsed time counted by the timer exceeds the specific time.

2. The electronic device described in claim 1, wherein:
   the first battery is held inside the electronic device by being covered with a battery cover; and
   the battery removal detection unit detects removal of the battery cover as the event of removal of the first battery from the electronic device.

3. The electronic device described in claim 1, wherein:
   the second battery has lower battery capacity than the first battery.

4. The electronic device described in claim 1, further comprising:
   a remaining battery power detection unit that detects the remaining power in the second battery;
   wherein the power control unit executes a shutdown process that turns electronic device power off when the second battery is used as the drive power source and the remaining power of the second battery detected by the remaining battery power detection unit is less than or equal to a specific threshold.

5. The electronic device described in claim 1, wherein:
   the second battery is a rechargeable battery;
   the electronic device has a charging circuit that charges the second battery; and
   the charging circuit does not charge the second battery when the remaining power of the second battery is greater than or equal to a specific threshold.

6. The electronic device described in claim 5, wherein:
   the second battery is electrically disconnected from the charging circuit while power is being supplied by the first battery.

7. The electronic device described in claim 1, further comprising:
   a display unit that displays information;
   wherein the power control unit reduces the display brightness of the display unit to reduce power consumption by the electronic device.

8. The electronic device described in claim 1, further comprising:
   a central processing unit that controls electronic device operation;
   wherein the power control unit reduces the drive frequency or the drive voltage of the central processing unit in order to reduce power consumption by the electronic device.

9. The electronic device described in claim 1, further comprising:
   a terminal that can connect to an external device;
   wherein the power control unit disables connecting the external device through the terminal in order to reduce power consumption by the electronic device.

* * * * *